United States Patent
Tirasirikul et al.

(10) Patent No.: US 8,910,218 B2
(45) Date of Patent: Dec. 9, 2014

(54) METHOD AND APPARATUS FOR PROVIDING CONTROL OF SET-TOP BOXES

(75) Inventors: Sangchai Tirasirikul, Flower Mound, TX (US); Rajesh Gopal, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 12/836,736

(22) Filed: Jul. 15, 2010

(65) Prior Publication Data
US 2012/0017250 A1 Jan. 19, 2012

(51) Int. Cl.
*H04N 7/18* (2006.01)
*H04N 7/173* (2011.01)
*H04N 21/475* (2011.01)
*H04N 21/442* (2011.01)
*H04N 21/454* (2011.01)
*H04N 21/436* (2011.01)

(52) U.S. Cl.
CPC ............. *H04N 7/18* (2013.01); *H04N 21/4755* (2013.01); *H04N 21/44222* (2013.01); *H04N 21/4753* (2013.01); *H04N 21/4542* (2013.01); *H04N 21/4751* (2013.01); *H04N 21/43615* (2013.01)
USPC ............. 725/78; 725/82; 725/91; 725/93; 725/100; 725/119

(58) Field of Classification Search
USPC .............................................. 725/78, 80, 119
See application file for complete search history.

(56) References Cited

U.S. PATENT DOCUMENTS

| | | | |
|---|---|---|---|
| 2003/0229900 A1* | 12/2003 | Reisman | 725/87 |
| 2004/0068747 A1* | 4/2004 | Robertson et al. | 725/98 |
| 2005/0155052 A1* | 7/2005 | Ostrowska et al. | 725/25 |
| 2005/0251827 A1* | 11/2005 | Ellis et al. | 725/47 |
| 2007/0079340 A1* | 4/2007 | McEnroe | 725/78 |
| 2007/0143776 A1* | 6/2007 | Russ | 725/14 |
| 2007/0288975 A1* | 12/2007 | Cashman et al. | 725/110 |
| 2008/0209487 A1* | 8/2008 | Osann et al. | 725/109 |
| 2008/0235733 A1* | 9/2008 | Heie et al. | 725/46 |
| 2008/0301779 A1* | 12/2008 | Garg et al. | 726/4 |
| 2009/0077586 A1* | 3/2009 | Wall et al. | 725/39 |
| 2009/0260042 A1* | 10/2009 | Chiang | 725/80 |
| 2010/0005496 A1* | 1/2010 | Ellis et al. | 725/87 |
| 2010/0125876 A1* | 5/2010 | Craner et al. | 725/61 |
| 2010/0217837 A1* | 8/2010 | Ansari et al. | 709/218 |
| 2010/0235869 A1* | 9/2010 | Zhao et al. | 725/82 |
| 2011/0067065 A1* | 3/2011 | Karaoguz et al. | 725/40 |
| 2012/0060181 A1* | 3/2012 | Craner | 725/28 |

* cited by examiner

*Primary Examiner* — Mushfikh Alam

(57) ABSTRACT

An approach is provided for controlling one or more set-top boxes. Communications is established among a plurality of set-top boxes. One of the set-top boxes is designated as a master set-top box that is configured to control one or more of remaining ones of the set-top boxes. A control message is generated to configure the remaining ones of the set-top boxes as child set-top boxes.

20 Claims, 11 Drawing Sheets

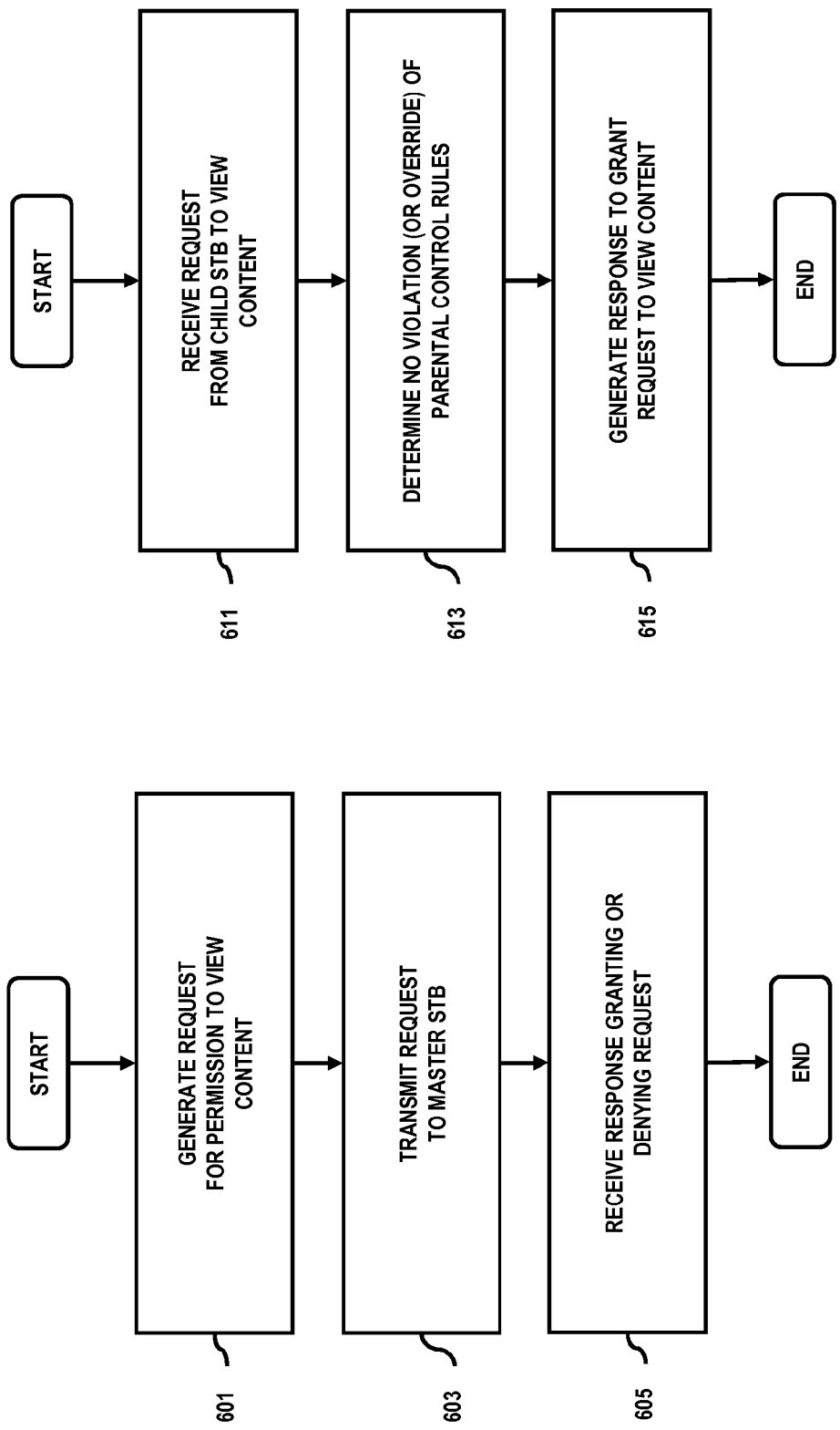

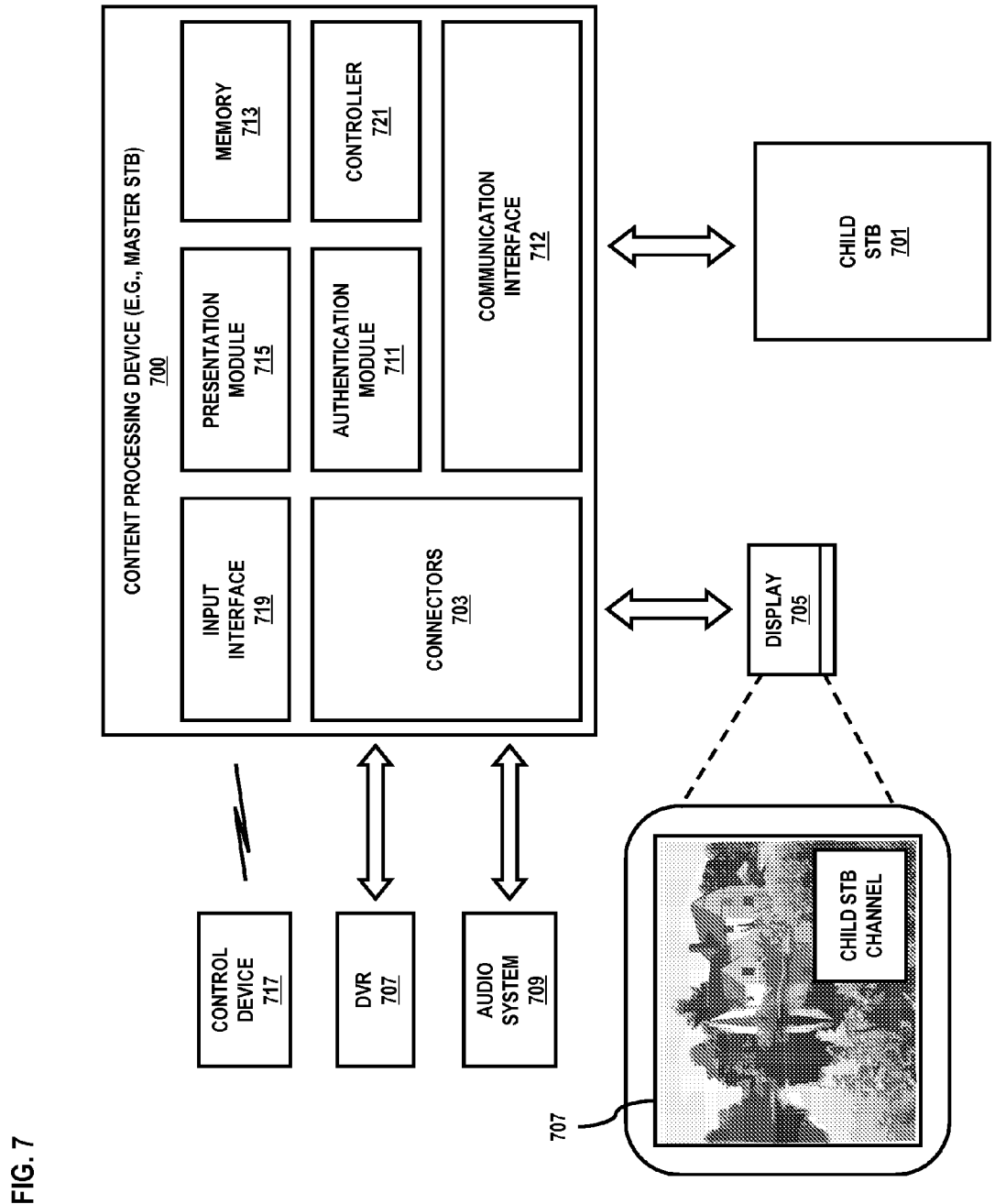

METHOD AND APPARATUS FOR PROVIDING CONTROL OF SET-TOP BOXES

BACKGROUND INFORMATION

Media devices, such as set-top boxes (STB), can act as a central hub for accessing entertainment and communication services. Many consumers are finding that these devices enable ubiquitous access to a wide variety of media content (e.g., broadcast television programs, on-demand programming, pay-per-view programming, and even Internet-based content). As a consequence, consumers often have multiple media devices, e.g., set-top boxes, in their households. Unfortunately, these set-top boxes are configured and operated on an independent basis. Users typically expend significant time and effort to individually program and/or configure their set-top boxes. In addition, traditionally there has been no coordination of the set-top boxes with respect to control and programming.

Therefore, there is a need for an approach that provides efficient programming and control of multiple media devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A and 6B are flowcharts of processes for requesting and granting permission to view content, according to various embodiments;

FIG. 7 is a diagram of a master content processing device (e.g., set-top box) configured to communicate with a slave content processing device, according to an exemplary embodiment;

DESCRIPTION OF THE PREFERRED EMBODIMENT

A preferred apparatus, method, and software for providing control of one or more set-top boxes are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing content (e.g., audio/video (AV)) signals for presentation to a user, such as a home communication terminal (HCT), a digital home communication terminal (DHCT), a stand-alone personal video recorder (PVR), a television set, a digital video disc (DVD) player, a video-enabled phone, an audio/video-enabled personal digital assistant (PDA), and/or a personal computer (PC), as well as other like technologies and customer premises equipment (CPE).

Figure 1:
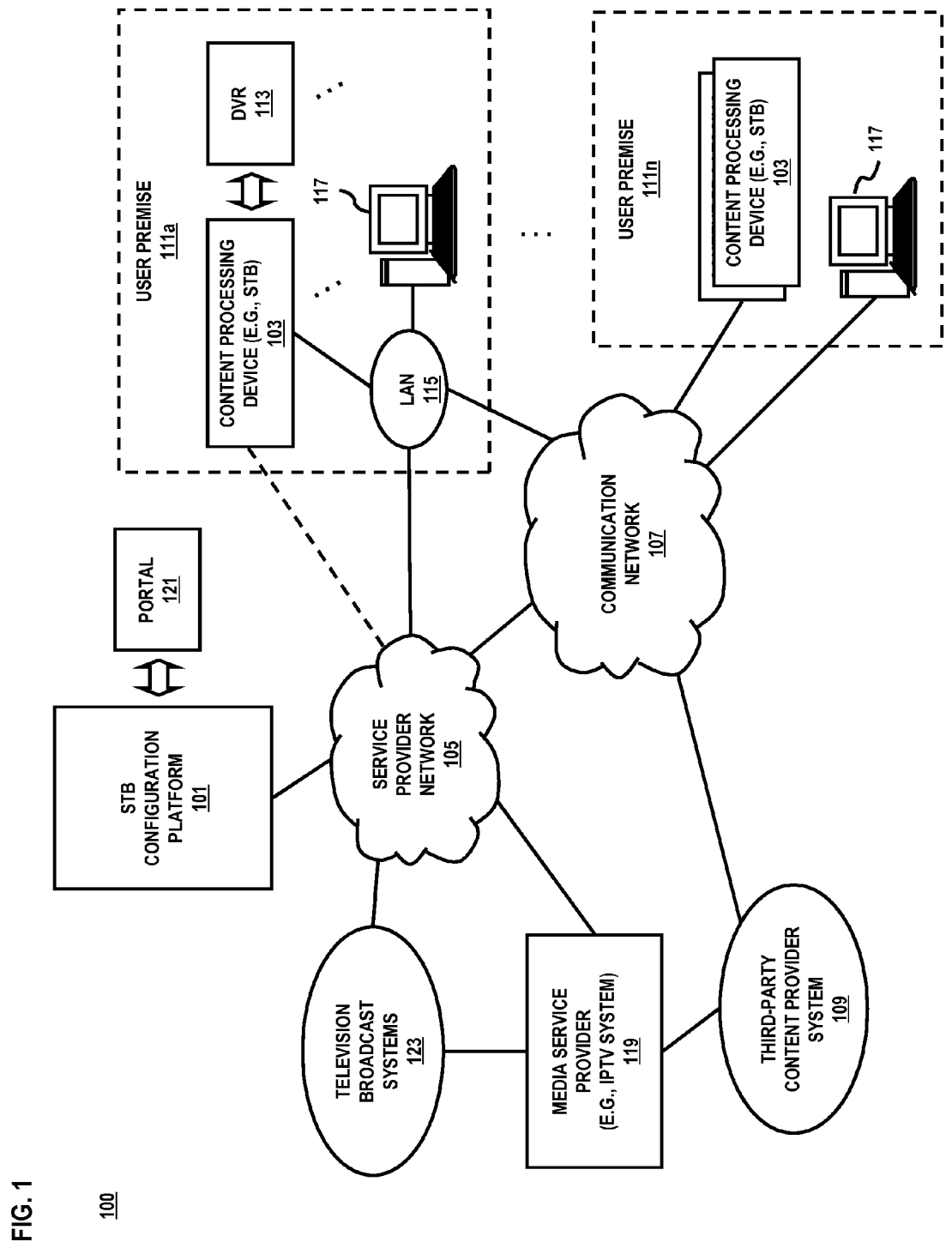
FIG. 1 is a diagram of a system including content processing devices (e.g., set-top boxes) arranged in master-child (slave) relationship, according to an exemplary embodiment.

FIG. 1 is a diagram of a system including content processing devices (e.g., set-top boxes) arranged in master-child (slave) relationship, according to an exemplary embodiment. For the purposes of illustration, system 100 includes a configuration platform 101 to provide coordination among multiple content processing devices 103 (e.g., set-top boxes) as to permit sharing of configuration parameters and to support monitoring capabilities of content presented by the set-top boxes. In certain embodiments, configuration platform 101 is implemented as one or more servers to communicate with the set-top boxes 103 for defining a hierarchical relationship among set-top boxes (STBs). By way of example, such relationship can be in form of master-slave (or master-child), whereby one device or process is designated as the controller (master device) for the other devices (child devices) within the group.

It is observed that television remains the prevalent global medium for entertainment and information as individuals spend a great deal of time tuning into televised media. Thus, the use of content processing devices, e.g., set-top boxes, continue to grow in popularity and sophistication. With the introduction of the digital video recorder (DVR), consumers are able to record content, such as televised media, to a memory medium so that the content may be accessed at a later time. It is noted that DVR capability can be provided as part of the STB, or as a peripheral device. Digital video recording systems offer consumers the ability to watch their favorite programs at a more convenient time by appropriately scheduling recording and later accessing of various programs for viewing. In typical multi-STB/DVR environments, the resources of the STB/DVR are independently managed and cannot be shared. For example, the user must individually configure and program the many DVRs throughout the user premise (e.g., home). A key feature of the STB is that of parental control, in which a subscriber can set what types of programs are allowed to be viewed; in this manner, a parent or guardian can prevent their children or other underage viewers from viewing "inappropriate" content. Because STBs operate independently, subscribers with multiple STBs are required to set the parameters associated with this parental control feature for each of the STBs. Such task of individually programming the STBs can be rather burdensome if the content filters involve numerous parameters that need to be specified by the subscriber. Also, because this task involves relatively significant effort, subscribers may be deterred from invoking the parental control feature in the first place.

Thus, the approach of system 100, according to certain embodiments, stems from the recognition that users can benefit from the ability to control their STBs efficiently. In one embodiment, the communication among STBs 103 are provided through STB configuration platform 101, whereby each of the STBs 103 directly communicate with service provider network 105. Under the scenario of system 100, STBs 103 may also utilize other networks, e.g., communication network 107, to access service provider network 105.

Network 107 can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (WiFi) networks, other wireless networks (e.g., 3G wireless broadband networks, mobile television networks, radio networks, etc.), terrestrial broadcasting networks, provider specific networks (e.g., fiber optic networks, cable networks, etc), and the like. Such networks may also utilize any suitable protocol supportive of data communications, e.g., transmission control protocol (TCP), internet protocol (IP), file transfer protocol (FTP), telnet, hypertext transfer protocol (HTTP), hypertext transfer protocol secure (HTTPS), asynchronous transfer mode (ATM), socket connections, Ethernet, frame relay, and the like, to connect content processing devices 103 to various sources of media content, such as one or more third-party content provider systems 109. Although depicted in FIG. 1 as separate networks, communication network 107 may be completely or partially contained within service provider network 105. For example, service provider network 105 may include facilities to provide for transport of packet-based communications.

User premise 111*a*-111*n* house multiple content processing devices 103 (e.g., STBs), which are typically deployed in various areas throughout the premise. In user premise 113*a*, STBs 103 utilize separate DVRs 113 to provide recording capability; although, as mentioned, such capability can alternatively be integrated with the STBs themselves. According to one embodiment, a local area network (LAN) 115 provides connectivity among STBs 103, as well as a computing device 117 (e.g., laptop, desktop, web appliance, netbook, etc.). As will be more fully described, STBs 103 can be arranged in a master-child model to permit efficient configuration management and monitoring of the child STB(s) via the master STB. A master STB can thus communicate with the child STB(s) over LAN 115, which includes a router and an access point or hub (not shown). It is contemplated that LAN 115 can be wireless or wired; accordingly, STBs 103 would be equipped with the appropriate network interface. For example, set-top box 103 communicatively couples to LAN 115 via a network cable (e.g., Ethernet cable), and/or the like. In certain embodiments content processing devices 103 may be configured to establish connectivity with LAN 115 via one or more wireless connections. Further, content processing device 103 and computing device 117 may be uniquely identified by LAN 115 via any suitable addressing scheme. For example, LAN 115 may utilize the dynamic host configuration protocol (DHCP) to dynamically assign "private" DHCP internet protocol (IP) addresses to content processing device 103 and computing devices 117, i.e., IP addresses that are accessible to devices such as devices 103 and 117 that are part of LAN 115 facilitated via router, i.e., connected to a router.

Alternatively, as illustrated by user premise 111*n*, STBs 103 can communicate with STB configuration platform 101 to effect the master-child relationship and to provide communications among STBs 103 according to this relationship. Namely, platform 101 can designate one of the STBs 103 as a master and the remaining others as child STBs. With this arrangement, control signaling or messages from the master STB are provided to platform 101 for dissemination to the child STBs. In certain embodiments, a portal 121 interfaces with platform 101 to permit access by users via STBs 103 and/or computing device 117. Portal 121 provides, for example, a web-based user interface to allow users to specify the relationship among STBs 103.

It is noted that user premises 111*a*-111*n* may be geospatially associated with one or more regions, as well as one or more user accounts. As such, content processing devices 103 associated with these user premises 111*a*-111*n* may be configured to communicate with and receive information from platform 101. In addition to the communications to effect the master-child relationship, this information may include control message, content, or user profile information.

Content processing devices 103 associated with these user premises 111*a*-111*n* may be configured to communicate with and receive signals and/or data streams from media service provider (MSP) 119 (or other transmission facility, e.g., third-party content provider system 109). These signals may include media content retrieved over a data network (e.g., service provider network 105 and/or communication network 107), as well as conventional video broadcast content.

As used herein, media content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or image media), and/or any other equivalent media form. In this manner, MSP 119 may provide (in addition to their own media content) content obtained from sources, such as one or more third-party content provider systems 109, one or more television broadcast systems 123, etc., as well as content available via one or more communication networks 107, etc.

Figure 2:
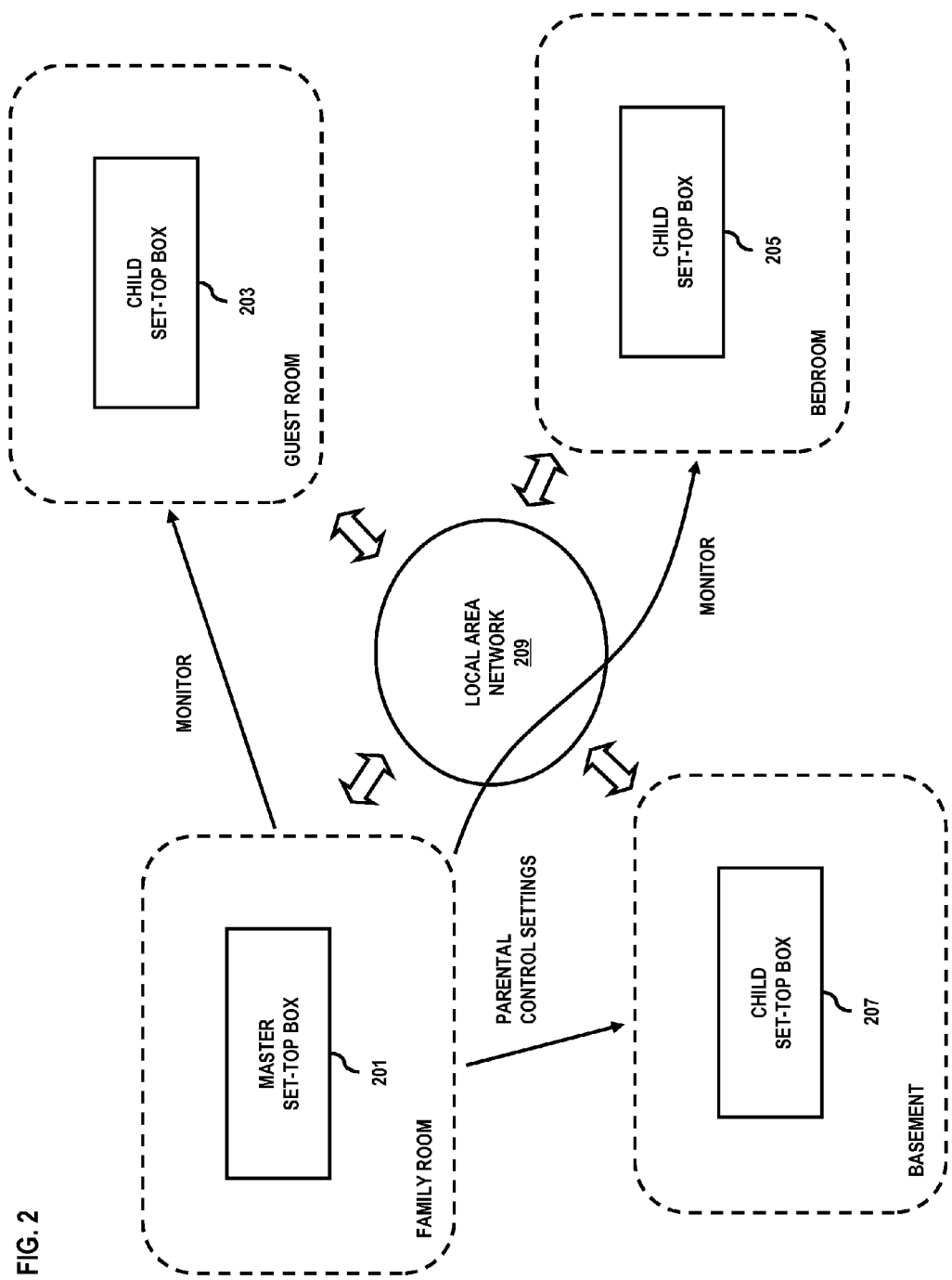
FIG. 2 is a diagram of a master set-top box communicating with other set-top boxes over a local area network, according to an exemplary embodiment.

FIG. 2 is a diagram of a master set-top box communicating with other set-top boxes over a local area network, according to an exemplary embodiment. In this example, a master set-top box 201 communicates with other set-top boxes 203-207 ("child" STBs) over a local area network 209. STBs 201-207 are situated in various spaces within the user premise (e.g., home): master STB 201 in the family room, child STB 203 in a guest room, child STB 205 in a bedroom, and child STB 207 in the basement. The designation of STB 201 as the master can be performed by a user; this process is detailed with respect to FIG. 3. After such designation, STB 201 can automatically notify the child STBs 203-207 that they are now in a master-child relationship with respect to STB 201. Upon establishment of these roles, master STB 201 can control/change any settings on anyone or all of the child STBs 203-207. For example, master STB 201 can change parental control settings, such as a parental control passcode (e.g., personal identification number (PIN)) of STB 207 through an exchange of one or more control messages.

Also, master STB 201 can monitor child STBs 203 and 205 to determine whether the content provided by these STBs 203 and 205 is appropriate for the users of these STBs 203 and 205. For example, master STB 201 can view the program or channel currently being played on the child STBs 203 and 205. Subsequently, one of the child STB 203 can request permission to watch certain channels or programs from a parental via master STB 201.

Figure 3:
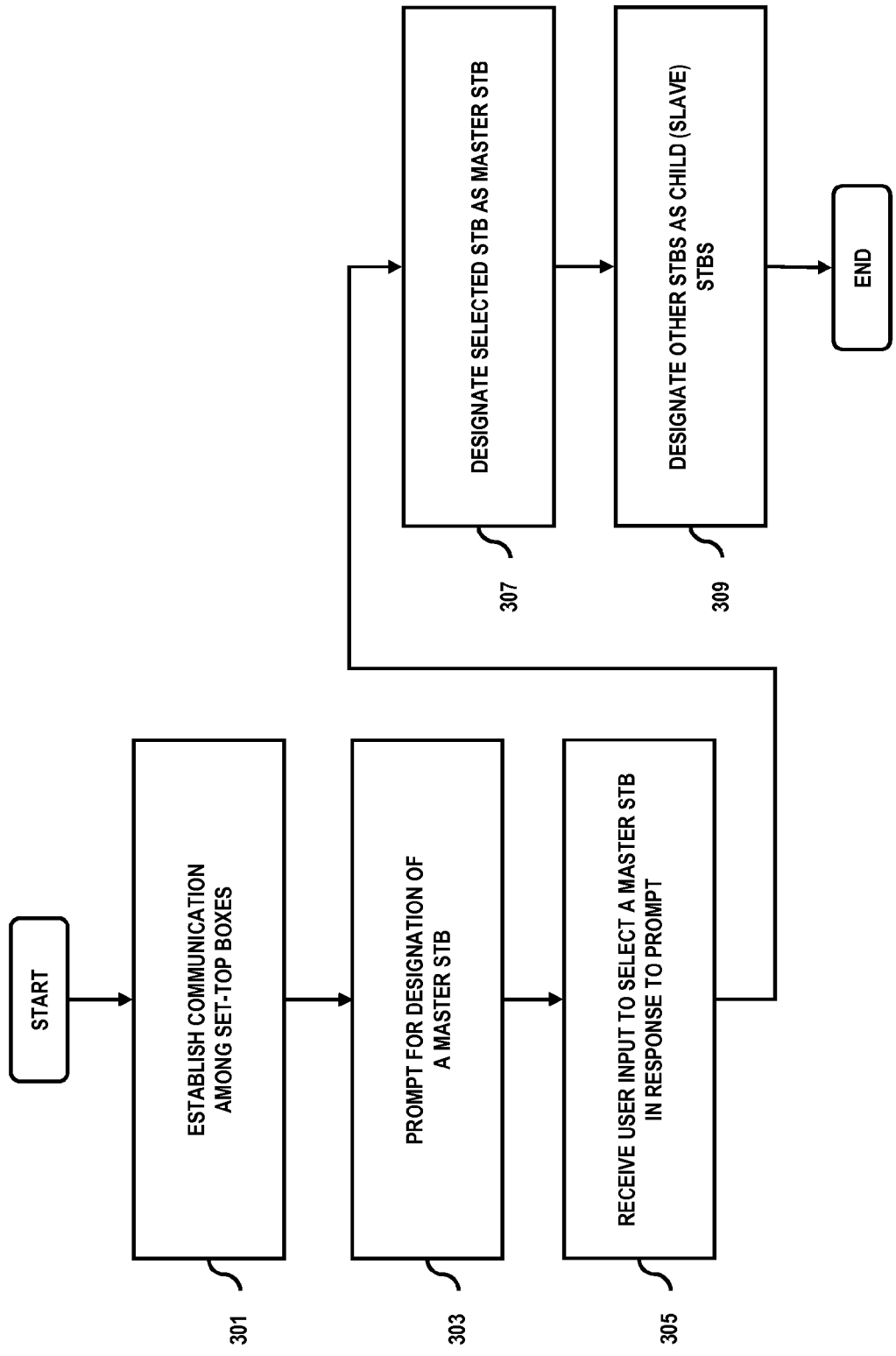
FIG. 3 is a flowchart of a process for establishing a master-slave relationship among set-top boxes, according to an exemplary embodiment.

FIG. 3 is a flowchart of a process for establishing a master-slave relationship among set-top boxes, according to an exemplary embodiment. By way of illustration, this process is explained using the example of FIG. 2. It is noted that the steps of the processes may be performed in any suitable order, as well as combined or separated in any suitable manner. In step 301, communication is established among STBs 201-207 using LAN 209. However, as described earlier, communication can also be provided using platform 101, which facilitates the communication indirectly. Next, as in step 303, a user can access anyone of the STBs 201-207 to invoke a user interface to assist with specifying an STB as the master; e.g., a graphical user interface can provide a prompt for the user to designate an STB among the group of STBs 201-207. At this point, assuming the user is utilizing STB 201 to indicate the master STB, the user responds to the prompt and selects the desired STB, per step 305. Under this scenario, the STB that is used to specify the master STB are one and the same—i.e., STB 201. The process then proceeds to designate the selected STB (e.g., STB 201) as the master STB, as in step 307. Subsequently, in step 309, this master STB 201 instructs or otherwise notify the other STBs 203-207 to behave as child STBs.

Upon establishment of the master-child relationship among STBs 201-207, configuration parameters values can readily be populated by the master STB 201, as next explained.

Figure 4:
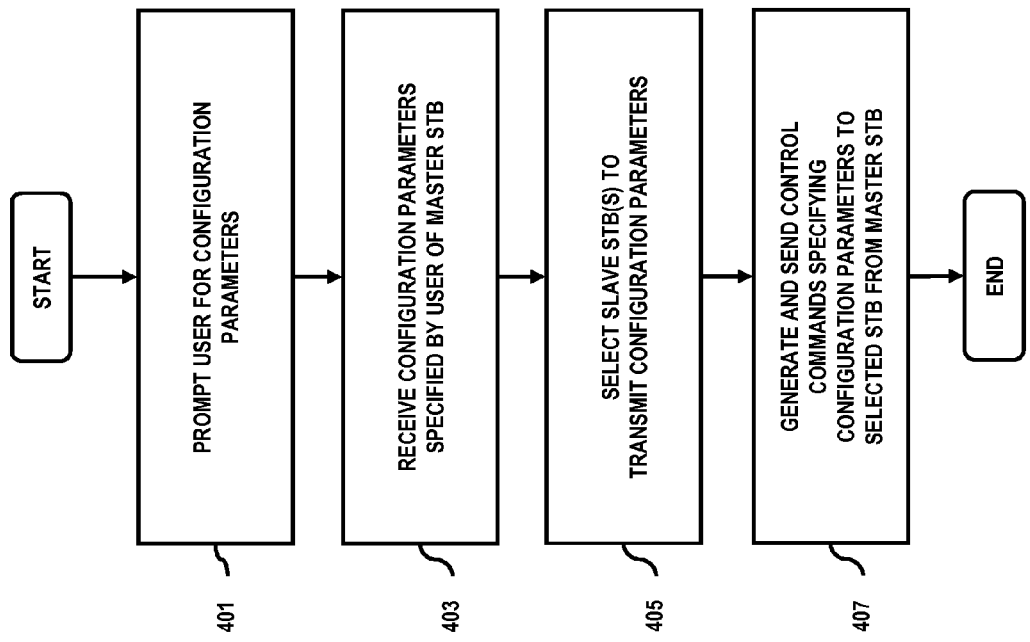
FIG. 4 is a flowchart of a process for controlling a slave (or child) set-top box to set configuration parameters, according to an exemplary embodiment.

FIG. 4 is a flowchart of a process for controlling a slave (or child) set-top box to set configuration parameters, according to an exemplary embodiment. In step 401, the user is prompted to specify certain configuration parameters values to be disseminate to the child STBs 203-207. According to one embodiment, the configuration parameters can include settings relating to a parental control feature. In step 403, configuration parameters specified by user of master STB 201 are received. In step 405, the process, as executed by master STB 201, can then prompt the user to select the particular slave (or child) STBs 203-207. Next, STB 201 generates and sends a control command or message to the selected STBs 203-207, per step 407.

Figure 5:
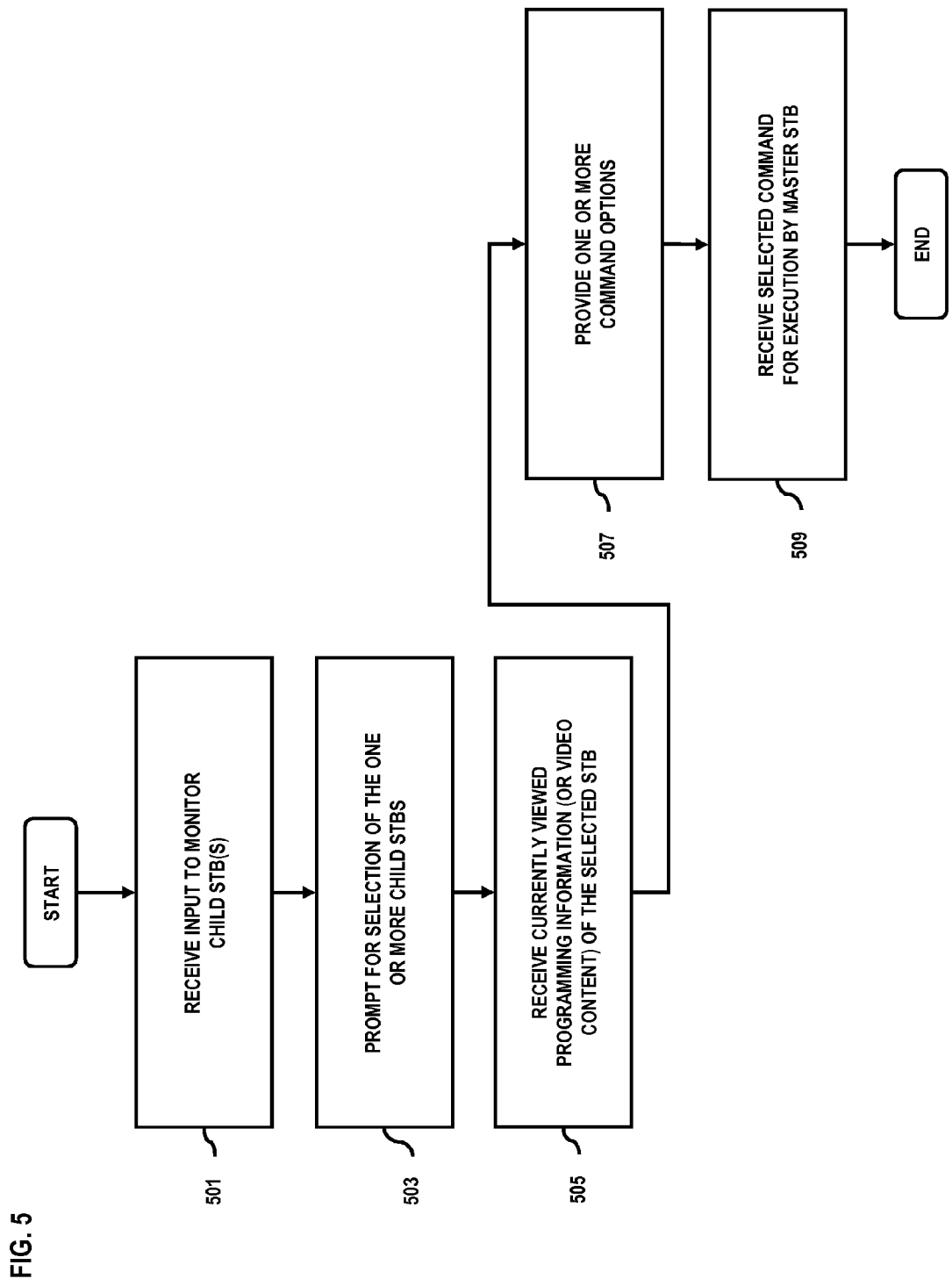
FIG. 5 is a flowchart of a process for monitoring a slave (or child) set-top box, according to an exemplary embodiment.

FIG. 5 is a flowchart of a process for monitoring a slave (or child) set-top box, according to an exemplary embodiment. As mentioned, the master-child relationship can accommodate various services, such as monitoring of the child STBs 203-207. This monitoring capability can be applied to supplement the described parental control feature. In step 501, STB 201 receives input from the user to launch the monitoring service; as such, STB 201 receives input relating to which child STB(s) 203-207 to monitor. Next, the process prompts the user for selection of the child STBs 203-207, as in step 503. At this juncture, the selected child STB, e.g., STB 203 and 205, are notified and instructed to generate currently viewed programming information (which may include video content) of STBs 203 and 205 for transmission to master STB 201. In one embodiment, currently viewed programming information can include programming guide information, e.g., title of the program or channel as well as any rating information. Moreover, currently viewed programming information can additionally or alternatively include the actual video that is being shown on the respective STBs 203 and 205. That is, a video stream of the programs are be transmitted to master STB 201.

In step 505, the currently viewed programming information is received. According to one embodiment, the process can offer certain command options relating to the treatment of the programming content on monitored STBs 203 and 205, per step 507. In step 509, the user selects the desired command option, which is then executed. For example, an option is to notify one or both of the STBs 203 and 205 that the content is inappropriate, and thus, the content will no longer be presented on those devices. This operation is illustrated in the GUI of FIG. 8B.

FIGS. 6A and 6B are flowcharts of processes for requesting and granting permission to view content, according to various embodiments. With these processes, a child STB (e.g., anyone of STBs 203-207) can request permission to view certain program from master STB 201. In some embodiments, the request process is triggered only after a parental control violation is detected at the requesting STB. In such circumstance, a parent is utilizing master STB 201 to watch a television broadcast, while a child is concurrently engaged in scanning for programming on child STB 203. For example, child STB 203 seeks to purchase pay-per-view content; it is assumed that parental control parameters dictate that permission is needed for any content that is to be purchased in addition to the actual content. Accordingly, parental control rules are specified and deployed on all STBs 201-207 to assist with determining whether to grant requests.

As depicted in FIG. 6A, a request is generated, e.g., by child STB 203, for permission to view content, as in step 601. In this example, child STB 203 seeks permission to view pay-per-view content. According to one embodiment, the request is automatically generated upon detection of a parental control rule violation. In step 603, the request is transmitted over LAN 209 to master STB 201. The request can include programming information about the desired content. Alternatively, child STB 203 can initiate the monitor capability to permit master STB 201 to display the order menu that the child is seeing via child STB 203. It is noted that the request can, in certain embodiments, be forwarded to STB configuration platform 101 for processing, whereby the request is relayed to master STB 201 from child STB 203 using facilities of the service provider network 105—e.g., fiber optic system, coax cable, etc. In step 605, child STB 203 then receives a response from master STB 201 granting or denying the request. If the request is denied, child STB 203 can present a notification to the child user, who can then attempt to find a more appropriate program.

From the perspective of the master STB 201 (shown in FIG. 6B), the above process involves receiving the request from child STB 203 to view a particular program or content, per step 611. As explained above, this request process can be triggered by detection of a parental control rule violation by the requesting STB, e.g., child STB 203. However, if no parental control feature is active on child STB 203, content filtering rules can still be implemented during this request process. Thus, upon receiving the request, master STB 201 can determine whether a parental control rule would be violated. One set of rules can be that no paid programming is permitted, and that the rating of the content be only for a general audience. If such rules are specified within master STB 201, the determination of this violation can be automatically performed when the request is received. Moreover, in the event that the monitoring capability is utilized in conjunction with this request procedure, the parent via master STB 201 can override the programmed rules or apply other criteria by viewing excerpts of the subject program (assuming the program has a preview that can be presented by child STB 203). Also, in the case where no parental control feature is invoked, the currently viewed program may be presented to master STB 201 for consideration. In step 613, the process determines that no violation of any parental control rule is found; or in the alternative, an override of the rules has been provided. Under this scenario, master STB 201 generates a response granting the request, as in step 615. If the response indicates denial of the request, child STB 203 would present an appropriate notification: "REQUEST DENIED. PLEASE SELECT ANOTHER PROGRAM MORE SUITABLE."

The above process, according to certain embodiments, advantageously provides convenient deployment of content viewing rules, and thus, promotes the usage of the parental control feature. Also, this approach avoids unnecessarily blocking programming in that an efficient override mechanism is supported.

FIG. 7 is a diagram of a master content processing device (e.g., set-top box) configured to communicate with a slave content processing device, according to an exemplary embodiment. Content processing device (or device) 700 is configured to communicate with a child STB 701, and may comprise any suitable technology to receive one or more content streams from a media source, such as MSP 119 and one or more third-party content provider systems 109. According to various embodiments, device 700 may also include inputs/outputs (e.g., connectors 703) to display 705 and DVR 707, as well as to audio system 709. As noted, DVR 707 can also be integrated with content processing device 700, according to another embodiment. Audio system 709 may comprise a conventional audio-video receiver capable of monaural or stereo sound, as well as multichannel surround sound. Audio system 709 may include speakers, ear buds, headphones, or any other suitable component configured for personal or public dissemination. As such, content processing device 700, display 705, DVR 707, and audio system 709, for example, may support high resolution audio and/or video streams, such as high definition television (HDTV) or digital theater systems high definition (DTS-HD) audio. Thus, content processing device 700 may be configured to encapsulate data into a proper format with required credentials before transmitting onto one or more of the networks of FIG. 1 and de-encapsulate incoming traffic to dispatch data to display 705 and/or audio system 709.

In an exemplary embodiment, display 705 and/or audio system 709 may be configured with internet protocol (IP) capability (i.e., includes an IP stack, or is otherwise network addressable), such that the functions of content processing device 700 may be assumed by display 705 and/or audio system 709. In this manner, an IP ready, HDTV display or DTS-HD audio system may be directly connected to one or more service provider networks 105 and/or communication networks 107. Although content processing device 700, display 705, DVR 707, and audio system 709 are shown separately, it is contemplated that these components may be integrated into a single component, or other combination of components.

An authentication module 711 may be provided by content processing device 700 to initiate or respond to authentication schemes of, for instance, service provider network 105, third-party content provider systems 109, or various other content providers, e.g., television broadcast systems 123, etc. Authentication module 711 may provide sufficient authentication information, e.g., a user name and password, a key access number, a unique machine identifier (e.g., MAC address), and the like, as well as combinations thereof, to a corresponding communications (or network) interface 712 for establishing connectivity to child STB 701. Authentication at content processing device 700 may identify and authenticate a second device (e.g., computing device 117 of FIG. 1) communicatively coupled to, or associated with, content processing device 700, or vice versa. Further, authentication information may be stored locally at memory 713, in a repository (not shown) connected to content processing device 700, or at a remote repository.

Authentication module 711 may also facilitate the reception of data from single or disparate sources. For instance, content processing device 700 may receive broadcast video from a first source (e.g., MSP 119), signals from a media application at second source (e.g., computing device 117), and a media content stream from a third source accessible over communication networks 107 (e.g., third-party content provider system 109). As such, display 705 may present the broadcast video, media application, and media content stream to the user, wherein content processing device 700 (in conjunction with one or more media applications) can permit users to experience various sources of media content traditionally limited to the data domains. This presentation may be experienced separately, concurrently, in a toggled fashion, or with zooming, maximizing, minimizing, or trick capabilities, or equivalent mode. In other exemplary embodiments, authentication module 711 can authenticate a user to allow them to interact with one or more third-party subscriber account features associated with third-party content provider systems 109.

Presentation module 715 may be configured to receive media content streams (e.g., audio/video feed(s) including media content retrieved over a data network) and output a result via one or more connectors 703 to display 705 and/or audio system 709. In this manner, presentation module 715 may also provide a user interface for a media application via display 705. Aural aspects of media applications may be presented via audio system 709 and/or display 705. In certain embodiments, media applications, such as media manager 701, may be overlaid on the video content output of display 705 via presentation module 715. The media content streams may include content received in response to user input specifying media content that is accessible by way of one or more third party content provider systems 105 and, thereby, available over at least one data network (e.g., network 105 and/or 107), wherein the media content may be retrieved and streamed by content processing device 700 for presentation via display 705 and/or audio system 709. Accordingly, presentation module 715 may be configured to provide lists of search results and/or identifiers to users for selection of media content to be experienced. Exemplary search results and/or identifiers may include graphical elements, channels, aural notices, or any other signifier, such as a uniform resource locator (URL), phone number, serial number, registration number, MAC address, code, etc.

Connector(s) 703 may provide various physical interfaces to display 705, audio system 709, as well as other peripherals; the physical interfaces may include, for example, RJ45, RJ11, high definition multimedia interface (HDMI), optical, coax, FireWire, wireless, and universal serial bus (USB), or any other suitable connector. The presentation module 715 may also interact with control device 717 for determining particular media content that a user desires to experience. In an exemplary embodiment, control device 717 may comprise a remote control (or other access device having control capability (e.g., computing device 117), a wireless user device, mobile phone, etc.) that provides users with the ability to readily manipulate and dynamically modify parameters affecting the media content being viewed. In other examples, content processing device 700 may be configured for voice recognition such that content processing device 700 may be controlled with spoken utterances.

In this manner, control device 717 may include (not shown) a cursor controller, trackball, touch screen, touch pad, keyboard, and/or a key pad for activating a media application, navigating through broadcast channels, search results, and/or media content identifiers, as well as performing other control functions. For instance, control device 717 may be utilized to maximize a media application, navigate through displayable interfaces, locate/specify/retrieve media content, modify content processing device 700 parameters, or toggle through broadcast channels and/or media content identifiers. Control device 717 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, control device 717 may comprise a memory (not illustrated) for storing preferences affecting media content viewed, which can be conveyed to content processing device 700 through an input interface 719. Input interface 719 may support any type of wired and/or wireless link, e.g., infrared, radio frequency (RF), BLUETOOTH, and the like. Thus, control device 717 may store user preferences with respect to media content, such as favorite sources, etc. Alternatively, user preferences may be tracked, recorded, or stored at content processing device 700 or at a network user profile repository (not shown) within service provider network 105. The preferences may be automatically retrieved and activated by a user at any time. It is noted that control device 717 may be separate from content processing device 700 or may be integrated within content processing device 700, in which case certain input interface hardware and/or software may be superfluous.

Particular embodiments enable users, via control device 717, to populate or otherwise configure a user profile. For instance, a user profile application may be provided or accessed by content processing device 700 to enable users to populate a plurality of entry fields with user information. A user profile may include one or more customized or personalized settings that affect any aspect of media content accessible via content processing device 700. More specifically, the profile may include: subscription information (account number, user name, password, avatar, moniker, etc.), subscriber demographics (age, gender, ethnicity, location of residence, zip code, school district, community, socioeconomic status, religion, marital status, ownerships, languages, mobility, life cycles, etc.), group/organizational affiliations (e.g., political), memberships, interests, buddies, friends, cohorts, system configurations, policies, associated users/devices, etc., as well as any other like personal information. Additionally, a user profile may include a "whitelist" specifying one or more accessible media content sources/subjects, a "blacklist" specifying one or more media content sources/subjects, as well as other equivalent customized settings, such as color schemes, sound effects, etc. According to certain embodiments, the user profile may include parental control parameters (e.g., program information, rating information, etc.) or any other parameters to filter content.

In other embodiments, the user profile may be established using the additional access devices described earlier (e.g., computing device 117, etc.). As such, user profile information may be stored at content processing device 700, e.g., at memory 713, and/or at a user site repository (not illustrated) directly connected to content processing device 700. Additionally or alternatively, profile information may be stored in a network-based repository (not shown), control device 717, and/or any other storage medium. Similarly, content processing device 700 (via memory 713), a user site repository, and/or a network-based repository may store a collection of digital audio, video and/or image content accumulated by a user. This collection may also include a plurality of identifiers, links, search results, or bookmarks to media content accessible over one or more communication networks 107, wherein selection of a particular identifier, link, search result, or bookmark may cause one or more media applications to obtain the content from an associated link (either directly from a data network source (e.g., content repository (not shown)) or indirectly from third-party content provider system 109 and/or MSP 119).

Figure 8A:
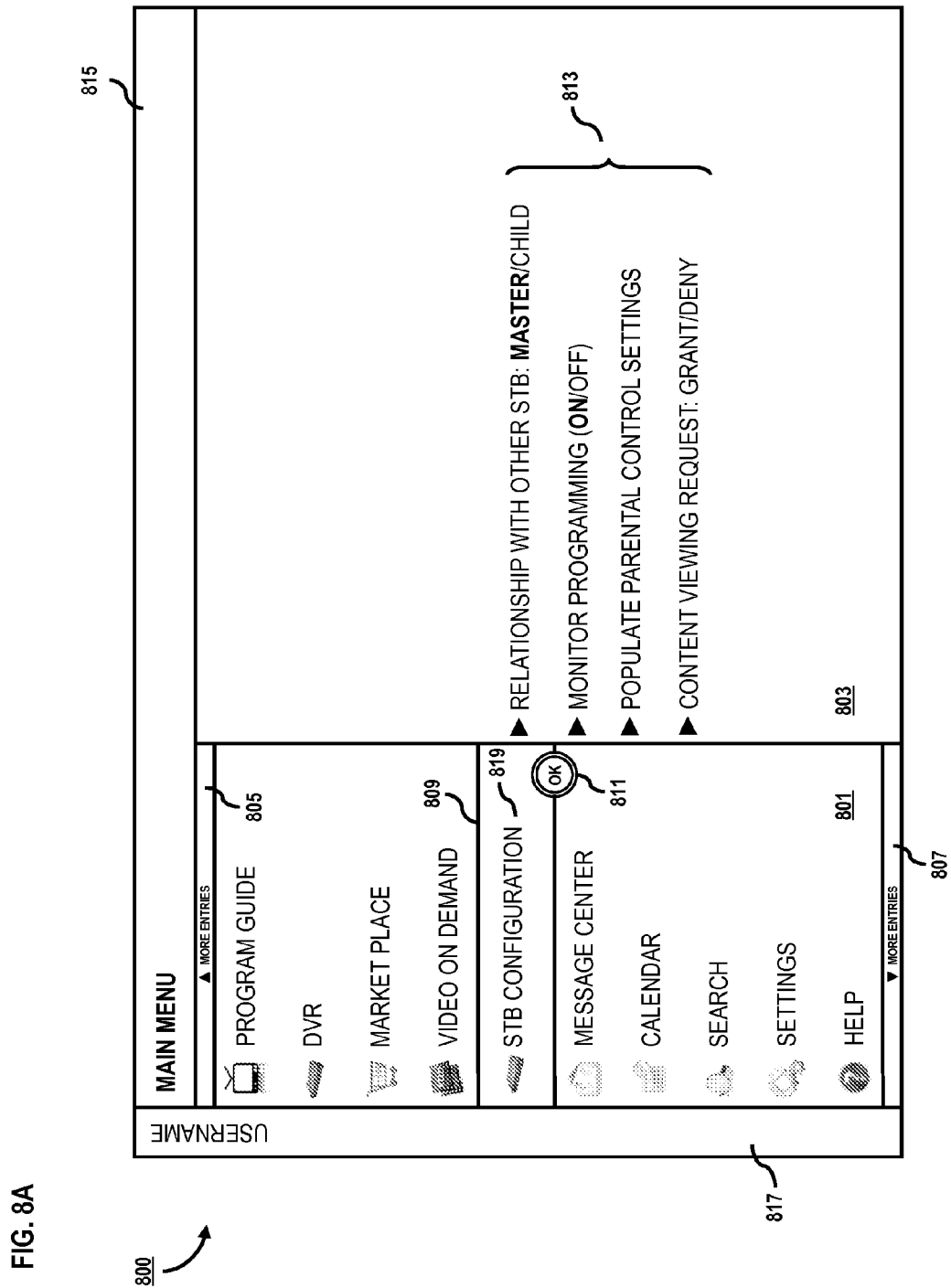
FIGS. 8A and 8B are diagrams of a graphical user interface (GUI) presented via a master set-top box, according to an exemplary embodiment.
Figure 8B:
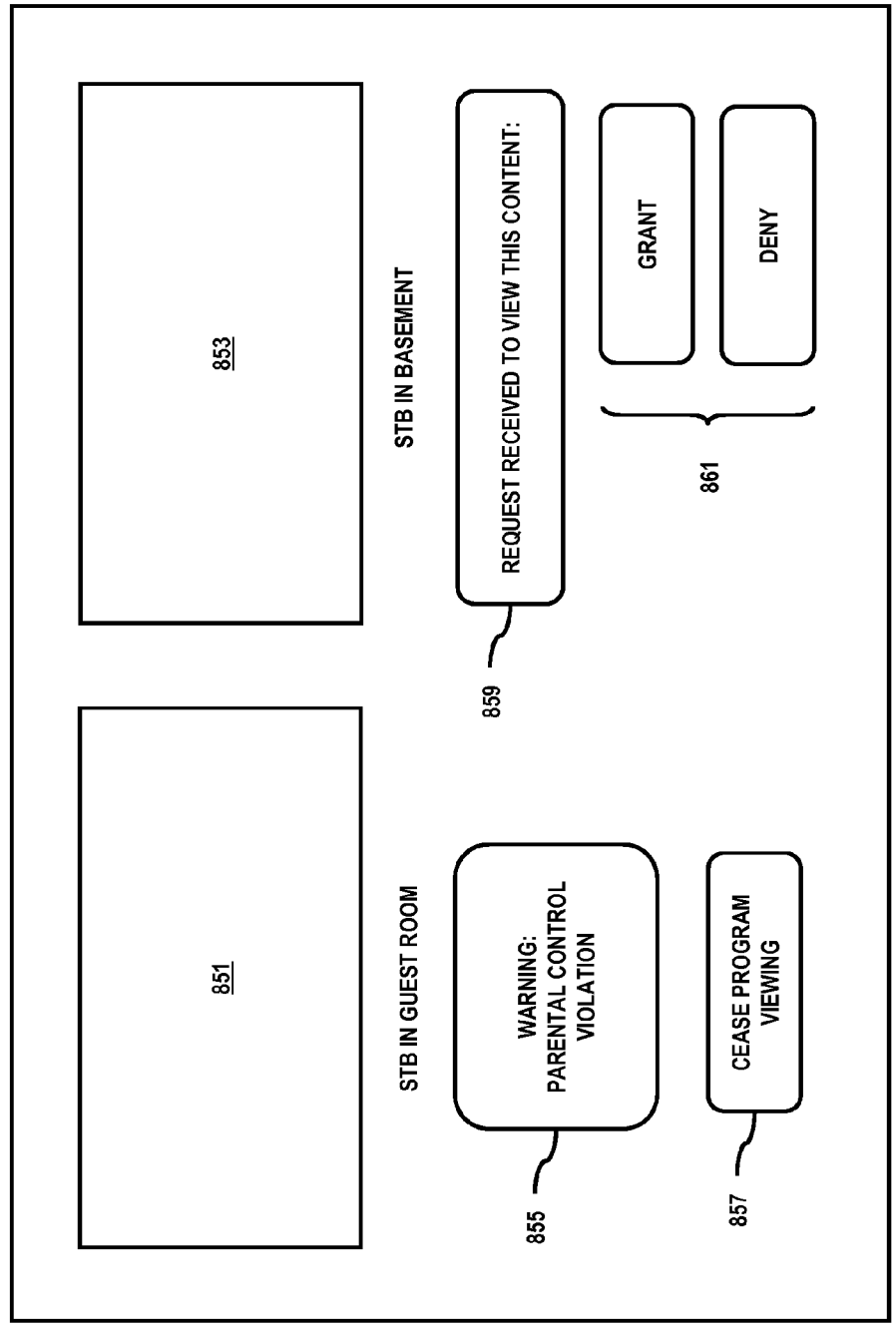

FIGS. 8A and 8B are diagrams of a graphical user interface (GUI) presented via a master set-top box, according to an exemplary embodiment. Continuing with the example of FIG. 2, anyone of the STBs 201-207 can present a GUI (or main menu) 800, as depicted in FIG. 8A. GUI 800 may be invoked using a variety of methods. For example, a user may select a dedicated "MENU" button on control device 717 (of FIG. 7) or a peripheral device communicatively coupled thereto, such as computing device 117, a mobile handset (not shown), and the like. It is recognized that any other suitable actuator of these devices may be additionally, or alternatively, used to access the functionality of main menu 800, such as triggering a "GUIDE" icon. Further, main menu 800 may be evoked by selecting an option within another interface or application, such as, for example, when navigating from a public screen (or navigational shell) to a user-specific screen, i.e., a private screen. As such, an executing device (e.g., content processing device 700, computing device 117, etc.) may require sufficient authentication information (e.g., username and password, etc.) to be input in order to access the functions of main menu 800.

As shown, GUI 800, providing a "main menu," may include one or more interactive viewing panes, such as panes 801 and 803. In particular embodiments, as will be described in more detail below, the content of pane 803 may be dynamically updated to display various menu options, interaction elements, information, etc., related to user interaction within pane 801, and vice versa. In this example, however, pane 801 includes a listing of selectable entries corresponding to one or more features (or options) that may be provided via content processing device 700. For example, entries may include: program guide options, DVR options, marketplace (or shopping) options, on-demand programming options, media manager options, messaging and communications options, searching options, setting options, help options, and the like. In certain embodiments, graphical elements may be provided to correspond to one or more of these entries and, as a result, may be correspondingly displayed therewith.

One or more header 805 and footer 807 fields may be provided and configured to indicate the existence of additional entries not displayed, but navigably available. Accordingly, users may browse through the entries of user interface 800 via, for instance, control device 717 associated with content processing device 700. Further, GUI 800 may include one or more fixed focus states (such as border 809) and/or distinctive magnification features, e.g., color, brightness, bolding, font type, text size, etc., that may be used to convey a "currently" navigated position. In this manner, when a user navigates to a desired entry, actuation of, for instance, an "OK" button on control device 717 may launch (or evoke) corresponding features and/or applications associated with the particular entry. According to some embodiments, an interactive "OK" option 811 may be utilized.

Moreover, main menu 800 may include one or more additional user options 813, when a user navigates to a particular entry. As shown in user options 813, the options allow users to execute the following functions: (1) specify the relationship of the particular STB (Master/Child), (2) invoke a monitoring capability to monitor another STB (this feature is enabled if the STB is designated as a master STB), (3) populate parental control settings from a master STB to one or more child STBs, and (4) specify whether a pending request is to be granted or denied. In other (or additional) embodiments, one or more aural descriptions of an entry "currently" navigated to and methods of interaction may be provided.

In certain other exemplary embodiments, main menu 800 may provide one or more navigation fields 815 and 817 to facilitate usability. For example, field 815 may provide the name of the function/option being accessed, e.g., "MAIN MENU." In this manner, when a user accesses a new function/option, field 815 may be automatically (or dynamically) updated. Field 817 may be utilized to indicate a user profile "currently" authenticated to system 100, e.g., "USER-NAME." Thus, a user may access one or more features and/or functions associated with the configuration and control of the STB by navigating to and selecting (or otherwise interacting with) entry 819 of main menu 800.

In FIG. 8B, GUI 850 illustrates the monitoring capability of a master STB (e.g., STB 201). Under this scenario, master STB 201 seeks to monitor the currently viewed content of child STBs 203 and 205, which are situated in the guest room and bedroom, respectively. By way of example, GUI 850 provides viewing areas 851 and 853 to receive programming information (which may include actual content) from the respective child STBs 203 and 205. With respect to child STB 203 in the guest room, a notification text box 855 is presented to indicate that the content is in violation of certain parental control rules. Accordingly, a button 857 is provided to enable the user of master STB 201 to cease the program presentation at child STB 203.

As for child STB 205 located in the bedroom, this STB 205 is requesting permission to view content that is being presented at area 853. Such request process follows that of FIGS. 6A and 6B. In this example, upon receipt of a request, a notification text box 859 of the request is presented. Consequently, buttons 861 are provided to specify a response: Grant or Deny. In this manner, the user can simply select the desired response. Alternatively, this selection can be made automatically based on predetermined content filtering parameters, in which case the appropriate button can be highlighted without user input.

The processes described herein for providing control of one or more set-top boxes according to a master-child model may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
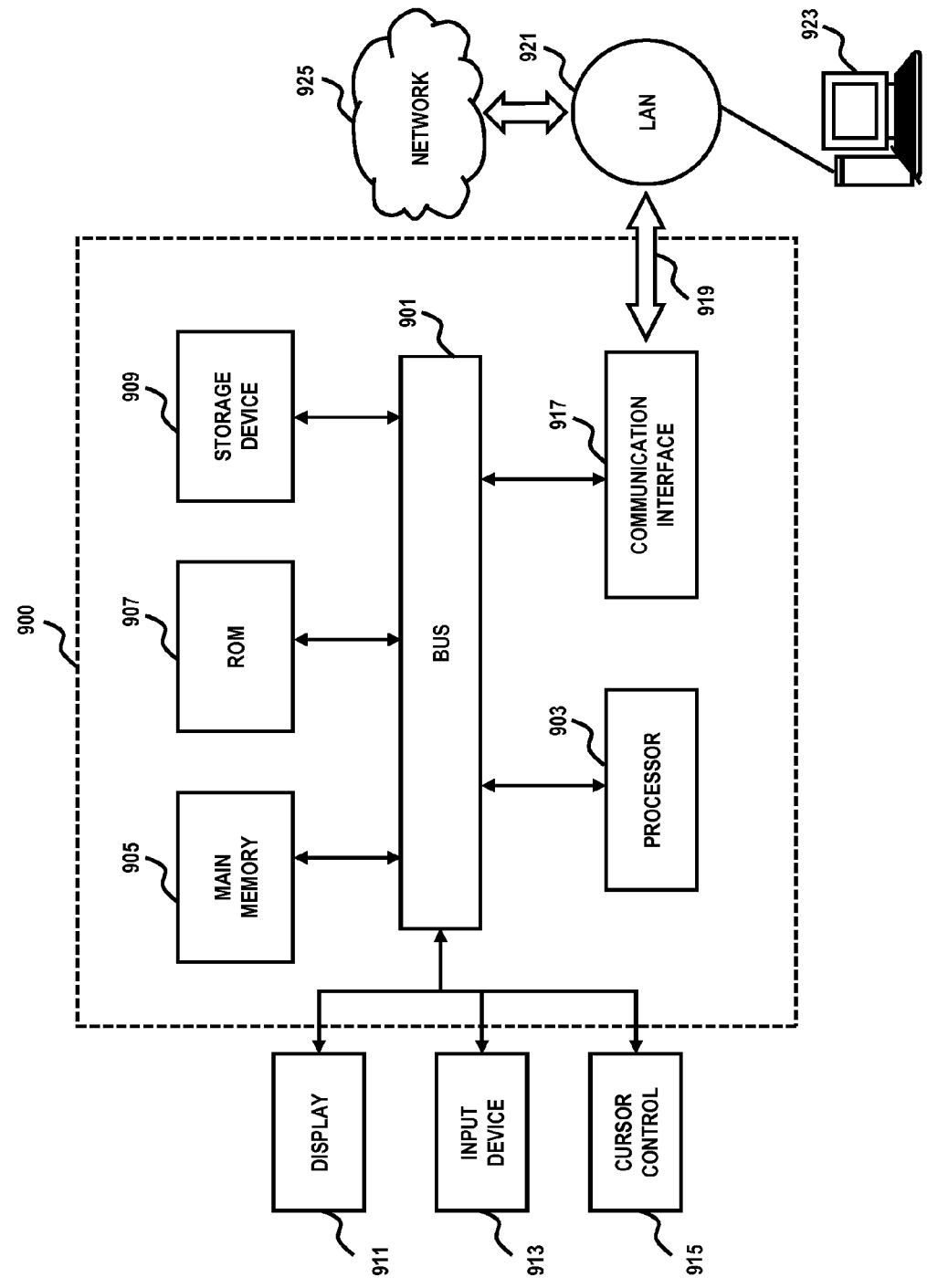
FIG. 9 is a diagram of a computer system that can be used to implement various exemplary embodiments.

FIG. 9 illustrates computing hardware (e.g., computer system) 900 upon which an embodiment according to the invention can be implemented. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage media ((or non-transitory media)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
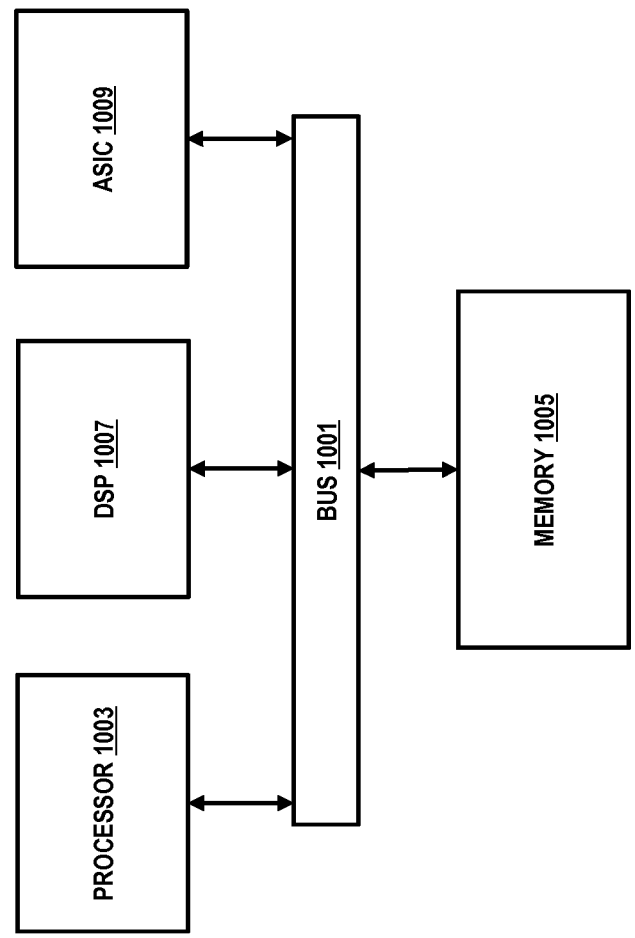
FIG. 10 is a diagram of a chip set that can be used to implement various exemplary embodiments.

FIG. 10 illustrates a chip set 1000 upon which an embodiment of the invention may be implemented. Chip set 1000 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. 3-6.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    establishing communications among a plurality of set-top boxes with a configuration platform, wherein the configuration platform is a server,
    designating, via a control message from the configuration platform, one of the set-top boxes as a master set-top box that is configured to control one or more of remaining ones of the set-top boxes;
    generating, at the configuration platform, another control message to configure the remaining ones of the set-top boxes as child set-top boxes;
    receiving, at the master set-top box, a programming request from one of the child set-top boxes to view content;
    generating a response to the request to view content automatically, without a user input at the master set-top box, to grant permission for viewing by the one child set-top box in response to the programming request,
    wherein the response to the request to view content is automatically generated based, at least in part, on predetermined content filtering parameters specified within the master set-top box, wherein the received programming request is automatically generated when one of the child set-top boxes is configured to deny access to view the content, wherein the request from one of the child set-top boxes to view content is sent to the configuration platform and then sent from the configuration platform to the master set-top box, wherein the configuration platform is positioned remote from a user premise and the plurality of set-top boxes, and the plurality of set-top boxes communicate with the configuration platform via a service provider network and the Internet, wherein the configuration platform includes a portal that provides a web-based user interface to permit access to users to specify the relationship among the plurality of set-top boxes, and wherein the control message from the configuration platform designating the one of the set-top boxes as a master set-top box is in response to specifying a relationship among set-top boxes at the web-based user interface of the portal included in the configuration platform;

generating a prompt to the user for setting a configuration parameter, wherein the configuration parameter relates to content scheduling, user preference information for the set-top box, user preference information for a digital video recorder, or a combination thereof;

receiving an input value of the configuration parameter from the user, wherein the input value further defines the configuration parameter;

selecting, at the master set-top box, one or more of the child set-top boxes to receive the configuration parameter value;

generating a control command specifying the configuration parameter value for transmission to the selected one or more of the child set-top boxes;

receiving an input signal, at the master set-top box, for monitoring one or more of the child set-top boxes;

prompting the user for determination of the one or more of the child set-top boxes to be monitored;

receiving currently viewed programming information of the selected child set-top box;

providing viewing areas on a GUI which display the currently viewed programming, from the one or more child set-top boxes;

presenting one or more command options, at the master set-top box, for selection by the user, wherein the command options are related to the treatment of the currently viewed programming information of the one or more monitored child set-top boxes; and determining the selected one of the command options for execution by the master set-top box in response to the received currently viewed programming information.

2. A method according to claim 1, wherein the master set-top box includes or is coupled to a digital video recorder.

3. An apparatus comprising:
at least one processor; and
at least one memory including computer program code for one or more programs,
the at least one memory and the computer program code configured to, with the at least one processor, cause the apparatus to perform at least the following,
establish communications among a plurality of set-top boxes with a configuration platform,
designate, via a control message from the configuration platform, one of the set-top boxes as a master set-top box that is configured to control one or more of remaining ones of the set-top boxes,
generate, at the configuration platform, another control message to configure the remaining ones of the set-top boxes as child set-top boxes,
receive, at the master set-top box, a programming request from one of the child set-top boxes to view content,
generate a response to the request to view content automatically, without a user input at the master set-top box, to grant permission for viewing by the one child set-top box in response to the programming request,
wherein the response to the request to view content is automatically generated based, at least in part, on predetermined content filtering parameters specified within the master set-top box,
wherein the received programming request is automatically generated when one of the child set-top boxes is configured to deny access to view the content,
wherein the request from one of the child set-top boxes to view content is sent to the configuration platform and then sent from the configuration platform to the master set-top box,
wherein the configuration platform is positioned remote from a user premise and the plurality of set-top boxes, and the plurality of set-top boxes communicate with the configuration platform via a service provider network and the Internet,
wherein the configuration platform includes a portal that provides a web-based user interface to permit access to users to specify the relationship among the plurality of set-top boxes, and
wherein the control message from the configuration platform designating the one of the set-top boxes as a master set-top box is in response to specifying a relationship among set-top boxes at the web-based user interface of the portal included in the configuration platform,
generate a prompt to the user for setting a configuration parameter, wherein the configuration parameter relates to content scheduling, user preference information for the set-top box, user preference information for a digital video recorder, or a combination thereof,
receive an input value of the configuration parameter from the user, wherein the input value further defines the configuration parameter,
select, at the master set-top box, one or more of the child set-top boxes to receive the configuration parameter value,
generate a control command specifying the configuration parameter value for transmission to the selected one or more of the child set-top boxes,
receive an input signal, at the master set-top box, for monitoring one or more of the child set-top boxes,
prompt the user for determination of the one or more of the child set-top boxes to be monitored,
receive currently viewed programming information of the selected child set-top box;
provide viewing areas on a GUI which display the currently viewed programming, from the one or more child set-top boxes,
present one or more command options, at the master set-top box, for selection by the user, wherein the command options are related to the treatment of the currently viewed programming information of the one or more monitored child set-top boxes, and determine the selected one of the command options for execution by the master set-top box in response to the received currently viewed programming information.

4. An apparatus according to claim 3, wherein the master set-top box includes or is coupled to a digital video recorder.

5. A method according to claim 2, wherein the master set-top box can change parental control settings of the one or more child set-top boxes.

6. A method according to claim 1, wherein each of the one or more child set-top boxes includes or is coupled to a digital video recorder.

7. A method according to claim 6, wherein the master set-top box can change parental control settings of the one or more child set-top boxes.

8. A method according to claim 1, wherein the master set-top box is configured to communicate with the one or more child set-top boxes over a local area network.

9. A method according to claim 8, wherein the local area network includes a wireless fidelity (WiFi) network.

10. A method according to claim 8, wherein the master set-top box includes or is coupled to a digital video recorder.

11. A method according to claim 8, wherein each of the one or more child set-top boxes includes or is coupled to a digital video recorder.

12. A method according to claim 1, wherein the master set-top box can change parental control settings of the one or more child set-top boxes.

13. An Apparatus according to claim 4, wherein the master set-top box can change parental control settings of the one or more child set-top boxes.

14. An apparatus according to claim 3, wherein each of the one or more child set-top boxes includes or is coupled to a digital video recorder.

15. An Apparatus according to claim 14, wherein the master set-top box can change parental control settings of the one or more child set-top boxes.

16. An apparatus according to claim 3, wherein the master set-top box is configured to communicate with the one or more child set-top boxes over a local area network.

17. An apparatus according to claim 16, wherein the local area network includes a wireless fidelity (WiFi) network.

18. An apparatus according to claim 16, wherein the master set-top box includes or is coupled to a digital video recorder.

19. An apparatus according to claim 16, wherein each of the one or more child set-top boxes includes or is coupled to a digital video recorder.

20. An apparatus according to claim 3, wherein the master set-top box can change parental control settings of the one or more child set-top boxes.

* * * * *